(No Model.)
C. L. SMITH.
HEATING AND DRYING APPARATUS FOR LAUNDRIES.
No. 261,267.　　　　　　　　Patented July 18, 1882.
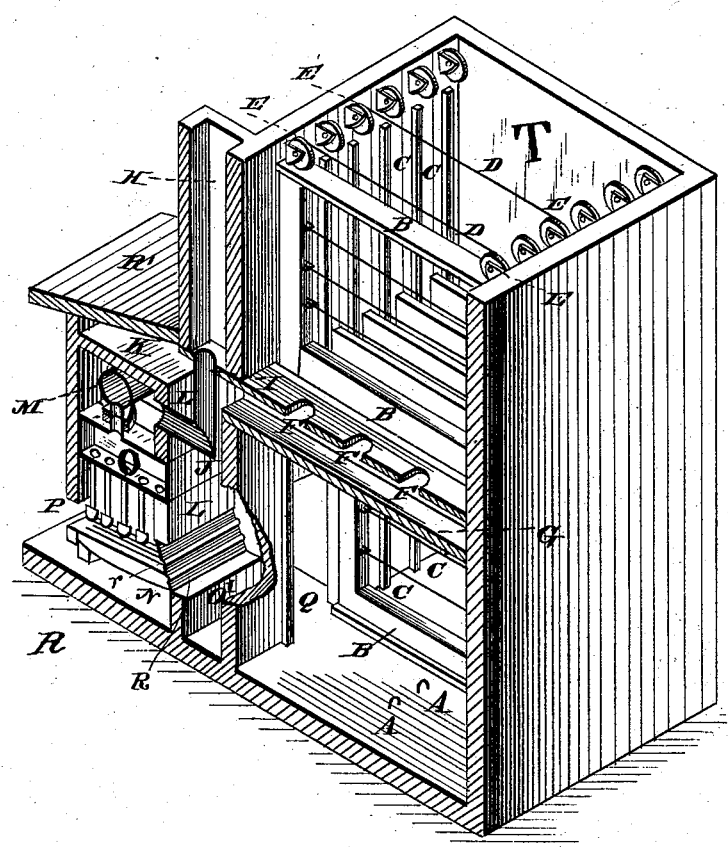
WITNESSES　　　　　　　　　　　　　　　INVENTOR

UNITED STATES PATENT OFFICE.

CHESTER L. SMITH, OF NORRISTOWN, PENNSYLVANIA.

HEATING AND DRYING APPARATUS FOR LAUNDRIES.

SPECIFICATION forming part of Letters Patent No. 261,267, dated July 18, 1882.

Application filed April 27, 1880. (No model.)

*To all whom it may concern:*

Be it known that I, CHESTER L. SMITH, of Norristown, in Montgomery county, and State of Pennsylvania, have invented certain new and useful improvements in furnaces for use in laundries applicable to the generation of steam, the heating of smoothing or sad irons, and the drying of clothing; and I do hereby declare the following to be a sufficiently full, clear, and exact description thereof to enable others skilled in the art to make and use the said invention.

The nature of my invention consists in the combination of a boiler or steam generator with a furnace adapted to heat smoothing-irons, and also to heat air for drying purposes, with a drying-chamber provided with vertically-sliding frames or horses located to receive and retain heated air from the boiler-furnace and exclude dust therefrom, and at the same time afford persons on the ironing-floor an easy access to the articles to be dried without the discomfort of exposure to the high temperature of the drying-room.

In conjunction with the above-stated feature my invention embraces a construction of furnace by which all ashes, dust, and foreign matter are excluded from the drying-apartment.

The drawing is a vertical section in isometrical perspective.

The boiler O (represented in the drawing) is of the variety known to engineers as "sectional drop-tube," and is described in reissued Letters Patent of the United States No. 5,076 to S. L. Wiegand.

The wall O', inclosing the rear of the ash-pit N, is of brick up to the level of the grate, above which is the fire-box or furnace composed of metallic plates R, set in inclined position, with flanges *r r* formed thereon, upon which flanges the smoothing or sad irons rest while being heated. The part of the furnace above the plates R is made of brick. The plates R, besides heating the irons resting on them, also heat air, which, rising, passes into the conductor G, and thence through openings F F F to the drying-chamber T, which is shown in the drawing as with the roof removed, so as to exhibit the interior construction.

A A are staples in the floor of the ironing-room, to which by hooks may be detained, while loading or unloading, the horses B B, sliding on the vertical guides C C up into or down from the drying-room overhead. These horses are supplied with cross-heads at top and bottom, which, when they are entirely up or down in place, fill and close up the openings through which they pass. The several horses are balanced by cords D D, passing over sheaves E E to weights sliding vertically in boxes, and also have cords attached to their lower cross-heads, by means of which they can be drawn down into the room below.

The floor upon which the furnace stands with the boiler is upon the level of the floor of the ironing-room. The furnace-door and ash-pit opening do not communicate with the ironing-room, but open outside of it, so that dust may not enter the ironing-room, the boiler and its furnace being contiguous to but outside of the ironing-room, and the drying-room being located above the ironing-room, and heated by currents of heated air passing through openings F F F in the conductor G from the boiler-room.

H is the chimney, I a collar-plate, J the smoke-pipe, K the cover, L the rear wall, M the front wall, and N the ash-pit, of the furnace. Under the boiler O is the fire-box composed of inclined plates R, having ribs or flanges on their external surfaces adapted to support smoothing-irons and heat them.

P is the furnace-door.

Q is an opening or doorway leading from the ironing-apartment into the space under the drying-room.

R' is the roof of the boiler-room.

By locating the drying-chamber above the level of the ironing-room and boiler the desired heat for drying is readily maintained without discomfort to the operatives, and the heated air is not wasted when the horses or frames are withdrawn to the room below, as is the case when such horses or drying-frames are withdrawn horizontally.

The operation of my invention is such that all fires and smoke and dust incident thereto are removed from the interior of the laundry and from the heating and drying-rooms. But one fire is needed to carry on all the operations of heating the sad-irons and drying-room and furnishing steam-power. The vertically-moving horses place the wet goods in the upper and hottest part of the room, and take but half the floor-space required by the usual horizontally-moving horses.

Having described my invention, what I claim as new and useful therein, and desire to secure as such by Letters Patent, is—

The combination of a steam-boiler and a furnace for heating the same, the fire-box of said furnace consisting in the whole or part of inclined metallic plates R, provided with flanges adapted to support and heat sad or smoothing irons, with a chamber or space contiguous to such furnace, and a drying-room heated from said furnace, located above said space and provided with vertically-guided and counterbalanced drying frames or horses B, arranged to slide from the drying-room to the space below for the introduction and removal of the washed goods, the whole arranged to operate substantially as and for the purpose set forth.

CHESTER L. SMITH.

Witnesses:
ROBT. MACKEY,
E. V. GLOVER.